United States Patent [19]
Drinkwater

[11] Patent Number: 5,513,463
[45] Date of Patent: May 7, 1996

[54] FISHING LINE LOADING APPARATUS

[76] Inventor: Gerald F. Drinkwater, 1322 E. Libby Dr., West Palm Beach, Fla. 33406

[21] Appl. No.: 268,199

[22] Filed: Jun. 29, 1994

[51] Int. Cl.⁶ ..................................................... A01K 89/00
[52] U.S. Cl. .......................... 43/25; 242/902; 242/423.2
[58] Field of Search ......................... 43/25, 4; 242/902, 242/419.9, 423.1, 423.2, 323

[56] References Cited

U.S. PATENT DOCUMENTS

| | | | |
|---|---|---|---|
| 967,734 | 8/1910 | Darrow | 43/25 X |
| 1,568,309 | 1/1926 | Auld | 242/404.2 |
| 2,305,045 | 12/1942 | Torrence | 43/25 X |
| 3,679,151 | 7/1972 | Rice | 242/902 X |
| 3,685,761 | 8/1972 | Zelinski | 242/902 X |
| 3,951,354 | 4/1976 | Bagby | 242/129.8 |
| 3,998,402 | 12/1976 | Christensen et al. | 242/399 |
| 4,034,930 | 7/1977 | Stevenson | 242/422.4 |
| 4,151,966 | 5/1979 | Lindsay | 242/404.2 |
| 4,360,172 | 11/1982 | Cope | 242/592 |
| 4,540,136 | 9/1985 | Rauch | 242/396.9 |
| 4,739,946 | 4/1988 | English | 242/129.8 |
| 4,776,527 | 10/1988 | Prowant | 242/591 |
| 4,795,107 | 1/1989 | Williams | 242/388.6 |
| 4,892,265 | 1/1990 | Cox | 242/539 |
| 4,922,644 | 5/1990 | Sherbondy | 242/406 |
| 5,029,409 | 7/1991 | Nouwens | 43/25 |

FOREIGN PATENT DOCUMENTS 559879  7/1958  Canada ..................... 43/25

Primary Examiner—P. Austin Bradley
Assistant Examiner—Jeanne M. Elpel
Attorney, Agent, or Firm—Malin, Haley, DiMaggio & Crosby

[57] ABSTRACT

A fishing line loading apparatus comprising an L-shaped frame for mounting on a conventional fishing pole while supporting a spool of fishing line to assist in loading fishing line from the supply spool to a fishing reel. A helical spring, mounted longitudinally on a spool axle compresses the supply spool between a pair of washers thereby applying frictional drag to the spool ends resulting in adjustable supply line winding tension.

5 Claims, 2 Drawing Sheets

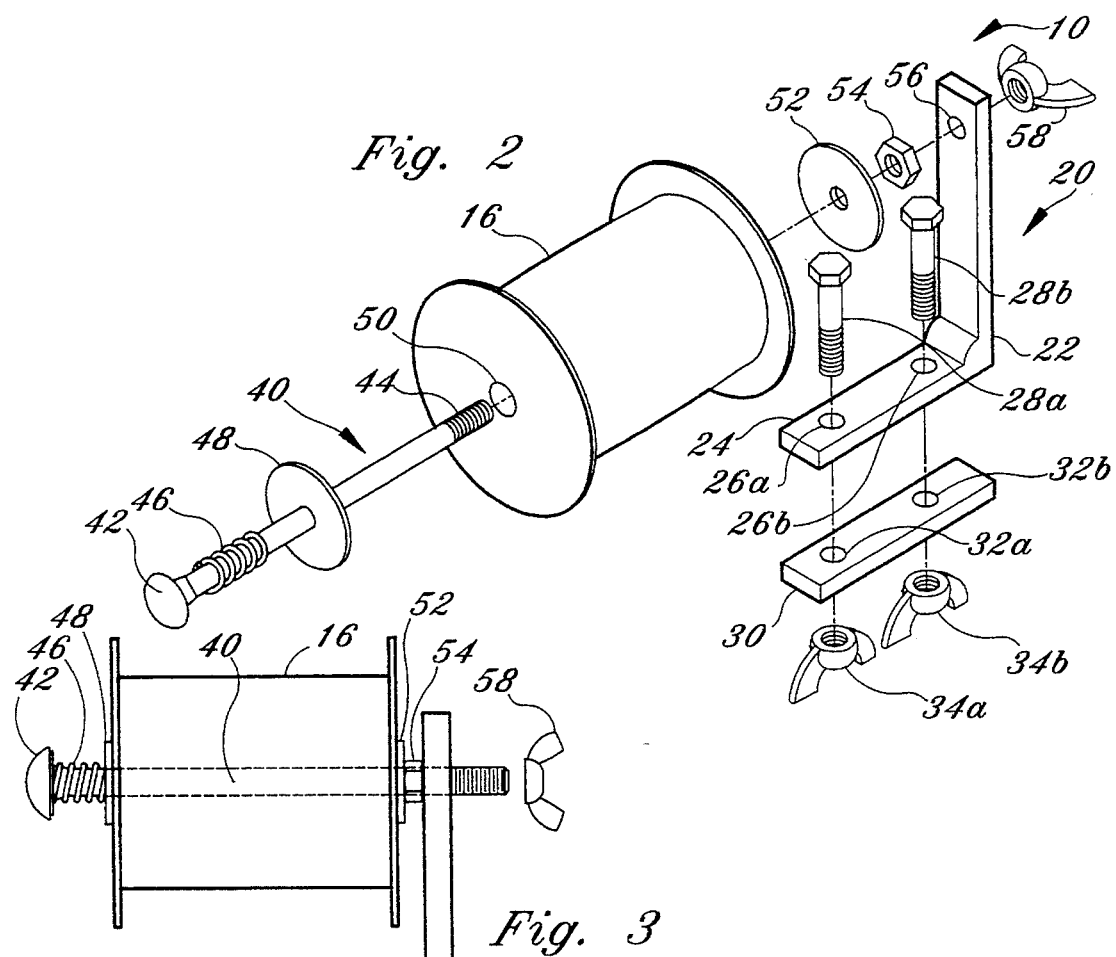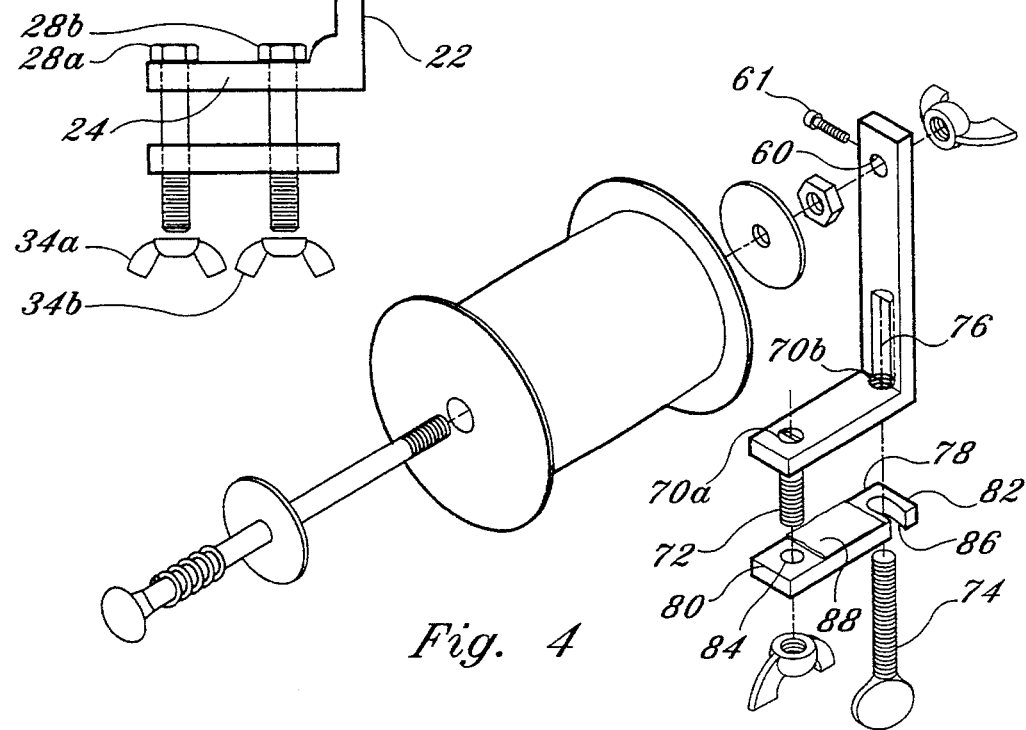

FISHING LINE LOADING APPARATUS

BACKGROUND OF THE INVENTION

1. Field of the Invention

The present invention relates to the field of fishing accessories, and more particularly, to an apparatus that aids in the winding of new fishing line onto a fishing reel.

2. Description of the Prior Art

A common problem for fishing enthusiasts is experienced during the process of winding new fishing line onto a fishing reel. While the process seems relatively straight forward, no one method of loading new fishing line onto a reel spool has gained wide acceptance. As a result, cumbersome and often inefficient methods are often used resulting in unsatisfactory results.

This process is complicated, in part, because the fishing industry has not developed any standards governing fishing line packaging. As a result, new fishing line is purchased wound on spools of a variety of sizes. Furthermore, modern monofilament fishing line is produced from lightweight plastic that, over time, develops a permanent bias, resulting from storage on its supply spool. This bias imparts a twisting force into the line that results in the coiling and kinking of loose line. Thus, it is important to feed new fishing line from its supply spool under tension to prevent kinking and result in a smooth, tight winding.

It is also important that the curvature bias developed in the supply line be accounted for when winding the line from the supply spool such that the curvature bias is aligned with the curvature of the reel spool. If a reel is wound in a direction different from the line bias, the line tends to kink and become entangled during casting.

Fishing enthusiasts find the reel loading process a cumbersome task often requiring the participation of two people. Traditionally, the first person holds the rod and reel assembly and winds the reel, while the second person supports the supply spool, usually by inserting a pencil, screwdriver, or the like through the supply spool aperture. As the reel holder winds new line from the supply spool, the person holding the supply spool applies resistance or drag to the supply spool, to ensure that the fishing line winds smoothly and tightly onto the reel.

Attempts to overcome these difficulties and eliminate the need for a second person to assist in the loading process have resulted in a number of fishing line loading devices. For instance, U.S. Pat. Nos. 5,029,409, 4,922,644, 4,776,527, 4,034,930, and 3,951,354 are all directed to rod mounted fishing line loading devices.

For example, U.S. Pat. No. 5,029,409 issued to Nouwens discloses a fishing line loading device comprising a U-shaped frame and a movable axle pin by which a fishing line supply spool may be mounted, and an attached tension plate for applying tension to the circumferential edges of a supply spool. The use of a U-shaped frame results in a device having a width of several inches, so as to accept wide spools of fishing line. The size of this device makes storage in often cramped tackle boxes difficult. Furthermore, since the spring loaded tension plate is non-adjustable, and supply spools come in a variety of circumferences, the tension plate may supply more or less tension than desired by the user.

U.S. Pat. No. 4,922,644, issued to Sherbondy, discloses a fishing line spool holder without an incorporated means for applying the necessary drag to the supply spool.

U.S. Pat. No. 4,776,527, issued to Prowant, discloses a fishing line spool holder for feeding fishing reels comprising a pair of arms each supporting opposing shafts which form an axle for the fishing line spool. As with the Nouwens patent, this configuration results in a relatively large device that occupies limited tackle box space when stored.

U.S. Pat. No. 4,034,930, issued to Stevenson, discloses a wire like spool holding device including a clasping member for fastening the device to the rod shaft, and a pair of wire like arms for insertion through the spool aperture. Since this configuration relies on a wire structure, the device may easily become damaged or deformed from storage in the often harsh fishing environment resulting in less than optimum performance.

These designs either, incorporate and overabundance of hardware which complicate the systems and structures, increasing manufacturing costs and requiring excessive maintenance, or; lack hardware or features fundamental to the reel loading process that severely limit the appeal of the devices. As a result, the foregoing fishing line loading devices have met with little consumer approval. The instant invention is intended to address and solve these problems which are not adequately resolved by the prior inventions.

SUMMARY OF THE INVENTION

The fishing line loading device of the present invention includes an L-shaped frame having an aperture existing on its upper vertical arm and a pair of spaced apertures existing on the base arm. The vertical frame arm aperture supports a removable spool axle apparatus upon which a fishing line supply spool is mounted. The pair of apertures existing on the base frame member accommodate a coupling means for quickly attaching the device to a fishing rod.

The spool axle further incorporates a means of fastening the spool axle to the vertical frame member for holding the supply spool in a specific orientation relative to the reel assembly, and a compact and adjustable means of applying the proper frictional resistance to the supply spool for ensuring that the supply line feeds at the proper tension. Winding tension is applied by a pair of circular washers, mounted on the spool axle in frictional engagement with opposing spool ends. The amount of tension placed on the supply line may be varied by the user by adjustment of a conventional nut.

The fishing line loading device is secured to the rod above the reel by a clamp fastened to the base frame arm by a pair of fasteners mounted in the base frame arm apertures such that the rod is interposed between the fasteners. The clamp surfaces that come in contact with the rod are lined with a non-abrasive material to prevent scratching the rod.

In accordance with the present invention, it is an object hereof to provide a fishing line loading apparatus that performs the dual task of holding a fishing line supply spool relative to the reel assembly while ensuring that line is fed at the proper tension.

An additional object of the instant invention is to provide a fishing line loading apparatus that is compact for easy storage.

Still an additional object of the instant invention is to provide a fishing line loading apparatus having a simple and efficient means of applying adjustable drag to the supply spool for ensuring that the line is fed under the proper tension.

A further object of the instant invention is to provide a fishing line loading apparatus that quickly and safely mounts on a fishing rod without scratching or otherwise damaging the rod.

Yet another object of the instant invention is to provide a fishing line loading apparatus capable of simple adjustment as to accommodate supply spools of differing sizes.

In accordance with these and other objects which will become apparent hereinafter, the instant invention will now be described with particular reference to the accompanying drawings.

BRIEF DESCRIPTION OF THE DRAWINGS

FIG. 2 depicts an exploded view of the instant invention.

FIG. 3 shows the instant invention assembled.

FIG. 4 depicts an exploded view of an alternate embodiment of the instant invention.

DESCRIPTION OF THE PREFERRED EMBODIMENTS

Figure 1:
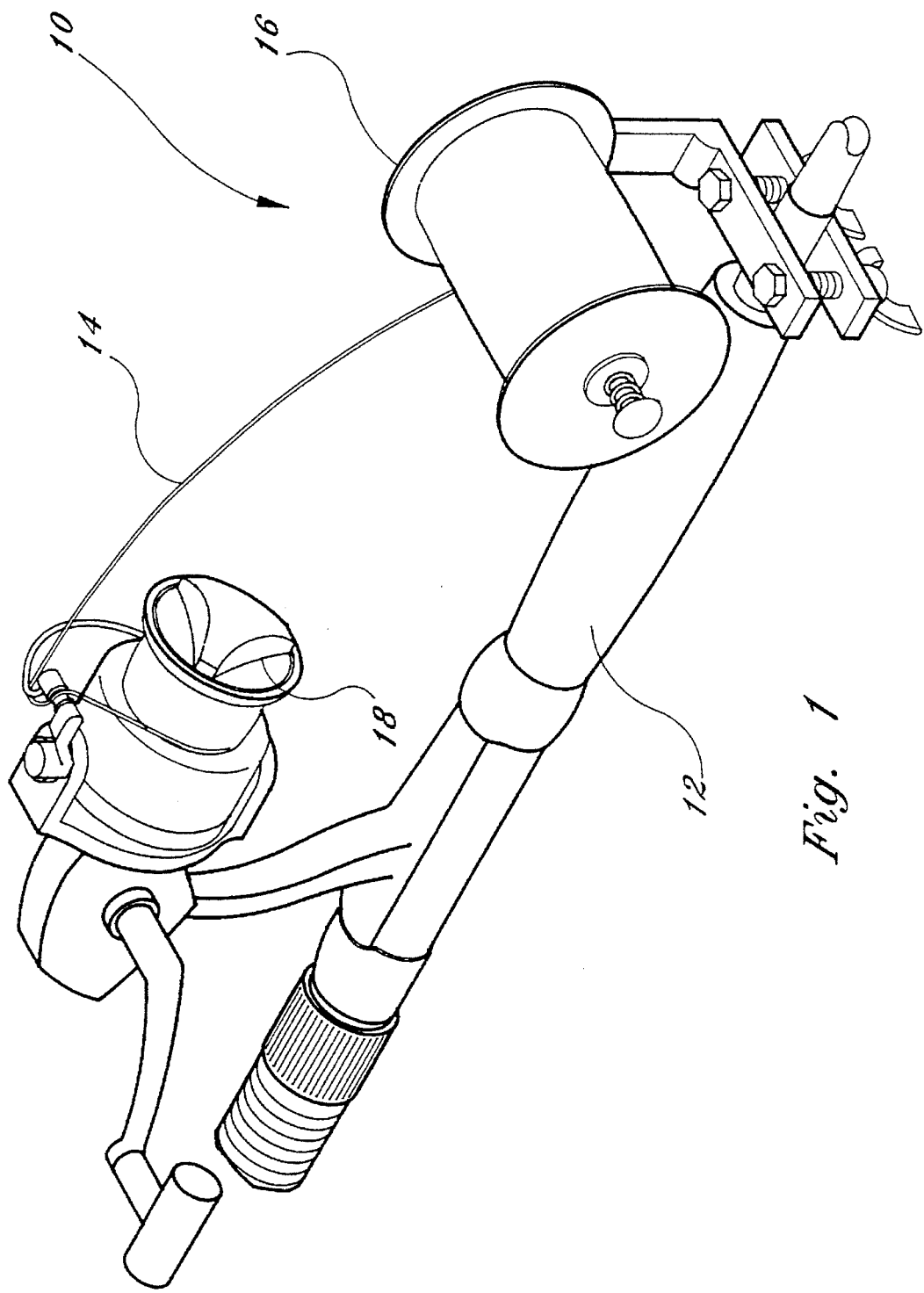
FIG. 1 depicts a perspective illustration of the instant invention holding a supply spool and mounted on a rod and reel assembly.

With reference to FIG. 1, there is depicted the fishing line loading apparatus of the present invention generally characterized by the reference numeral 10, mounted on a fishing rod 12, and supplying fishing line 14 from a supply spool 16 to a reel 18.

Turning now to FIGS. 2 and 3, there is shown an embodiment of the fishing line loading apparatus 10, comprising a generally L-shaped frame 20 having a support arm 22 and a base arm 24. Base arm 24 incorporates a pair of spaced smooth bore apertures 26a and 26b through which conventional threaded fasteners 28a and 28b may be inserted. A fastening plate 30, having a pair of complementary smooth bore apertures 32a and 32b in axial alignment with base arm apertures 26a and 26b, is positioned such that fasteners 28a and 28b also extend through apertures 32a and 32b. Fastening plate 30 is secured by a pair of conventional wing nuts 34a and 34b.

Thus, fishing line loading apparatus 10 is removably mounted on rod 12 by inserting fasteners 28a and 28b through base arm apertures 26a and 26b, positioning rod 12 such that it is interposed between fasteners 28a and 28b, sandwiching rod 12 between the underside of base arm 24 and fastening plate 30, and rigidly securing apparatus 10 relative to rod 12 by proper rotation of wing nuts 34a and 34b, as shown in FIG. 1. To prevent scratching of the rod 12 surface, base arm 24 and fastening plate 30 may incorporate a lining of felt, neoprene, or any other suitable material.

Means for supporting said fishing line supply spool is provided whereby supply spool 16 is mounted on fishing line loading apparatus 10 as follows: First, a threaded supply spool axle 40, having a head end 42 and a threaded end 44, is equipped with a helical spool axle spring 46 and a first spool axle washer 48 by inserting the supply spool end 44 through spring 46 and washer 48 in a conventional manner such that spring 46 is interposed between spool axle head 42 and washer 48 as best shown in FIGS. 2–4. Second, supply spool 16 is mounted on spool axle 40 by inserting axle end 44 though spool aperture 50 such that axle end 44 completely penetrates supply spool 16. Third, a second axle washer 52 is mounted on axle 40 in a conventional manner and the axle assembly is secured by axle nut 54. Finally, the foregoing assembly is mounted on support arm 22 by inserting axle end 44 through support arm aperture 56 and securing said assembly to support arm 22 with wing nut 58, as best shown in FIG. 3. Thus, supply spool 16 is interposed between, and in frictional engagement with, first washer 48 and second washer 52.

Turning now to FIG. 4, there is depicted an alternate embodiment fabricated from machined aluminum or steel. The alternate embodiment also contemplates an L-shaped frame 20 having a support arm 22 and a base arm 24. Support arm 22, incorporates an aperture 56 for mounting supply spool 16 on spool axle 40 as previously described. Support arm 22 further incorporates a threaded aperture 60 through which set screw 61 is disposed such that, when properly seated, set screw 61 bears against supply spool axle 40 thereby preventing rotational movement of axle 40.

The alternate embodiment depicted in FIG. 4 further contemplates mounting hardware modifications. For example, this embodiment incorporates a pair of threaded base arm apertures 70a and 70b through which threaded fasteners 72 and 74 may be disposed. As best seen in FIG. 4, aperture 70b is located proximal the intersection of support arm 22 and base arm 24, and support arm 24 incorporates a semi-cylindrical groove 76 aligned with aperture 70b for housing extended length threaded thumb screw 74. This embodiment further contemplates fastening plate 78 having a first end 80 and a second end 82 and incorporating a smooth bore aperture 84 proximate said first end 80, and a generally U-shaped notch 86 proximate said second end 82.

The embodiment depicted in FIG. 4 is removably mounted on rod 12 by: Inserting fastener 72 through base arm aperture 70a, and inserting thumb screw 74 through base arm aperture 70b, positioning rod 12 such that it is interposed between fasteners 72 and 74, sandwiching rod 12 between the underside of base arm 24 and fastening plate 78, and rigidly securing apparatus 10 relative to rod 12 by proper rotation of wing nut 88 and thumb screw 74. Fastening plate notch 86 allows for quick decoupling of the instant invention from rod 12 by rotating fastening plate 78 counter clockwise 90 degrees enabling a user to remove rod 12 without manipulating fasteners 72 and 74. Likewise, the instant invention can be easily coupled to rod 12 by properly positioning the rod and rotating fastening plate 78 clockwise 90 degrees such that notch 86 engages fastener 74 thereby securing the instant invention to rod 12. To prevent scratching of the rod 12 surface, base arm 24 and fastening plate 30 may incorporate a lining of felt, neoprene, or any other suitable material, generally depicted as 88 in FIG. 4.

To initiate the line loading process, the supply spool 16 line is extended and properly secured to reel 18. As reel 18 is manually actuated, drawing line from spool 16, spool 16 rotates, and helical spring 46 applies an adjustable, compressive frictional force to spool 16 thereby maintaining drag on the spool and ensuring that fishing line 14 is fed at the proper tension during the winding process. Drag is increased by further compressing spring 46 such that the compressive force applied equally to spool 16 by washers 48 and 52 increases resulting in greater rotational resistance. Rotation of axle nut 54 functions to precisely set the desired drag resulting in proper line tension.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An apparatus demountably coupled to a fishing rod for supporting a fishing line supply spool, said spool having a first spool end and a second spool end and an aperture extending therethrough, while winding fishing line from the spool to a reel located on the rod comprising:

a generally L-shaped frame with a base arm having a first threaded aperture and a second threaded aperture, and a spool support arm having a smooth bore aperture;

said second base arm aperture located proximal the intersection of said support arm and said base arm, said support arm incorporating a semi-cylindrical groove aligned with said second aperture;

a fastening plate having a smooth bore aperture and a U-shaped notch;

a first threaded fastener, disposed through said first base arm aperture and said fastening plate aperture, pivotally securing said fastening plate to said base arm with a conventional wing nut;

a second threaded thumb screw fastener, disposed through said second base arm aperture and particularly housed within said support arm semi-cylindrical groove such that said second fastener does not interfere with said spool rotation;

said fastening plate being pivotally secured to said base arm by said first fastener such that said fastening plate notch matingly engages said second fastener when rotated to align with said base arm;

said fishing rod is interposed between said base arm and said fastening plate whereby said rod is rigidly secured by compression between said base arm and said fastening plate;

means for supporting said fishing line supply spool, wherein said means for supporting said supply spool comprises a bolt, said bolt having a bolt head and an elongate body having a threaded end portion, said bolt mating with said support arm aperture and secured by a conventional wing nut such that said supply spool retains rotational freedom of movement;

means for applying rotational drag to said supply spool, wherein said means for applying drag comprises a spring biased force applied equally to said spool ends.

2. An apparatus according to claim 1, wherein said means for applying rotational drag to said supply spool comprises a helical spring, positioned on said bolt, and interposed between said bolt head and a first washer, said supply spool interposed between said first washer and a second washer, said second washer interposed between said supply spool and a nut mated to said bolt, such that rotation of said nut functions to compress said helical spring thereby increasing the frictional force applied by said washers to said spool ends resulting in increased rotational resistance.

3. An apparatus according to claim 2, wherein said support arm has a threaded set screw aperture securing a locking set screw for preventing said spool support bolt from rotating relative to said support arm.

4. An apparatus demountably coupled to a fishing rod for supporting a fishing line supply spool, said spool having a first spool end and a second spool end and an aperture extending therethrough, for winding fishing line from the spool to a reel located on the rod comprising:

a generally L-shaped frame, defined by a base arm neutrally perpendicular thereto and having a pair of apertures, and spool support arm having an aperture;

a fastening plate having a pair of apertures spaced as to correspond too, and align with, said base arm apertures;

a pair of threaded fasteners, connected to said base arm apertures and inserted through said fastening plate apertures, each fastener secured by a nut, such that said fishing rod is interposed between said base arm and said fastening plate whereby said L-shaped frame is rigidly secured to said rod between said base arm and said fastening plate by compression;

means for supporting said fishing line supply spool comprising a bolt, said bolt having a bolt head and an elongate body including an end portion, said bolt received within said spool aperture and connected to said support arm aperture such that said supply spool retains rotational freedom of movement; and means for applying rotational drag to said supply spool, wherein said means for applying drag includes a helical spring, positioned on said bolt and bearing against a washer disposed between said spring and a spool end; and, means for compressing said helical spring whereby compression of said helical spring increases the frictional force applied by said washer and said support arm to said spool ends resulting in increased rotational resistance.

5. An apparatus according to claim 4, wherein said support arm has a threaded set screw aperture securing a locking set screw for preventing said spool support bolt from rotating relative to said support arm.

* * * * *